United States Patent [19]

McSweeney et al.

[11] 3,831,193

[45] Aug. 20, 1974

[54] BI-DIRECTIONAL SCANNING OF A PHASE ENCODED MAGNETIC MESSAGE

[75] Inventors: William McSweeney, Plainfield; Stefan J. Stas, Metuchen, both of N.J.

[73] Assignee: Litton Business Systems, Inc., Morristown, N.J.

[22] Filed: Oct. 31, 1972

[21] Appl. No.: 302,540

[52] U.S. Cl. ................ 360/42, 235/61.11 D, 360/2, 360/117

[51] Int. Cl. ........................ G11b 5/02, H03k 9/00

[58] Field of Search .... 179/100.2 HT; 235/61.11 D, 235/61.11 E, 61.12 R, 61.12 M; 340/174.1 A, 174.1 B, 174.1 H

[56] References Cited

UNITED STATES PATENTS

| | | | |
|---|---|---|---|
| 3,408,483 | 10/1968 | Zuse | 235/61.11 D |
| 3,543,007 | 11/1970 | Brinker et al. | 235/61.11 D |
| 3,598,964 | 8/1971 | Dell et al. | 235/61.11 D |
| 3,631,424 | 12/1971 | Regitz | 340/174.1 H |
| 3,671,722 | 6/1972 | Christie | 235/61.11 E |
| 3,731,293 | 5/1973 | McFiggans | 340/174.1 H |
| 3,737,632 | 6/1973 | Barnes | 340/174.1 H |

*Primary Examiner*—Bernard Konick
*Assistant Examiner*—Stewart Levy
*Attorney, Agent, or Firm*—Norman Friedman; Robert F. Rotella

[57] ABSTRACT

A magnetic reproducing system includes logic control circuitry which is responsive to the slope polarity of the transduced data signal just prior to the first data peak of the signal so as to provide a detected output signal having a predetermined initial pulse polarity direction regardless of the initial slope polarity of the transduced data signal.

4 Claims, 5 Drawing Figures

BI-DIRECTIONAL SCANNING OF A PHASE ENCODED MAGNETIC MESSAGE

BACKGROUND OF THE INVENTION

This invention relates to record sensing apparatus, and more particularly to a system for determining the relative direction of scan of a handheld magnetic transducer over a record carrier containing a phase modulated magnetically encoded message.

In one type of known record sensing system employing a handheld transducing device, the transducing device is manually caused to scan a magnetically encoded label or tag containing an information data track. As the transducer sweeps across the label, it senses the magnetization direction of the information bits recorded thereon and produces a corresponding output signal which is then fed to an associate electronics unit for decoding and further processing of the retrieved data. Circuitry is included in the electronics unit which operates to derive a data synchronous clock directly from the incoming data, thereby avoiding the need for a separate clock track on the label. Since the transducer device is handheld, it has been found that the rate of sweep of the transducer by an operator may vary during the course of travel over a label, i.e., the relative velocity between label and transducer will tend to vary as the transducer is swept across the label. Accordingly, the electronics unit includes timing circuitry which senses the time interval from data bit to data bit and adjusts the synchronous timing signal or clock as a function of the previous time interval of a transduced data signal. Further details of this type of record sensing system and timing circuitry operation may be had by reference to co-pending applications Ser. No. 115,044, now U.S. Pat. No. 3,750,108, entitled SELF-CLOCKING RECORD SENSING SYSTEM, and Ser. No. 239,457, now U.S. Pat. No. 3,770,987, entitled EXTENDED RANGE TIMING CIRCUIT.

However, a problem associated with the above type of record sensing system is that in order for the clock signal to be properly derived from the incoming data signal and thus provide for the correct decoding of the data message, the handheld transducer device must be maintained in a given orientation or pole piece polarity with respect to the direction of sweep across the magnetic record. Stated another way, it was heretofore required that the record carrier be scanned in a prescribed direction relative to the pole piece polarity of the transducer device, hereinafter referred to as a forward direction, along the length of a magnetic strip containing the encoded data. Should the transducer or reader be scanned across the carrier in a reverse direction, and with the same relative pole piece polarity as in the forward direction for example, then the output signal produced will be the inverse of that produced by scanning in a forward direction, and thus will cause incorrect system timing.

Accordingly, it is an object of the present invention to provide a system for determining the magnetization polarity of data bits in an information signal recorded on a record carrier.

It is another object of the present invention to provide an improved data detection system wherein the direction of scan of a transducer device relative to the start and end code of a data message on a record carrier can be easily determined.

SUMMARY

Briefly described the system of the invention includes negative and positive slope detectors and a head orientation flip-flop circuit. The flip-flop is arranged to be set to a "1" or high state, for example, when the initial slope polarity of a detected data waveform signal is negative, and to a "O" or low state when the initial slope polarity is positive. The output of the head orientation flip-flop is used to signify to a logic arrangement, which of the slope detector outputs is to be used to control the data processing circuits and provide for the correct retrieval of the data message, regardless of the reader pole piece polarity relative to the direction of scan. Operation of the system is such that if a negative slope polarity is initially detected, then with regard to subsequent sampling of the waveform, when the detected slope polarity is positive, a data "1" will be provided as an output signal. Conversely, if a positive slope polarity is initially detected, then on subsequent sampling of the waveform signal, when the detected slope polarity is negative, again a data "1" bit output will be provided.

The novel features which are considered characteristic of the invention will be set forth with particularity in the appended claims. The invention itself, however, both as to its organization and method of operation, as well as additional objects thereof, will best be understood from the following description when read in connection with the accompanying drawings wherein:

DESCRIPTION OF AN ILLUSTRATIVE EMBODIMENT

Figure 1:
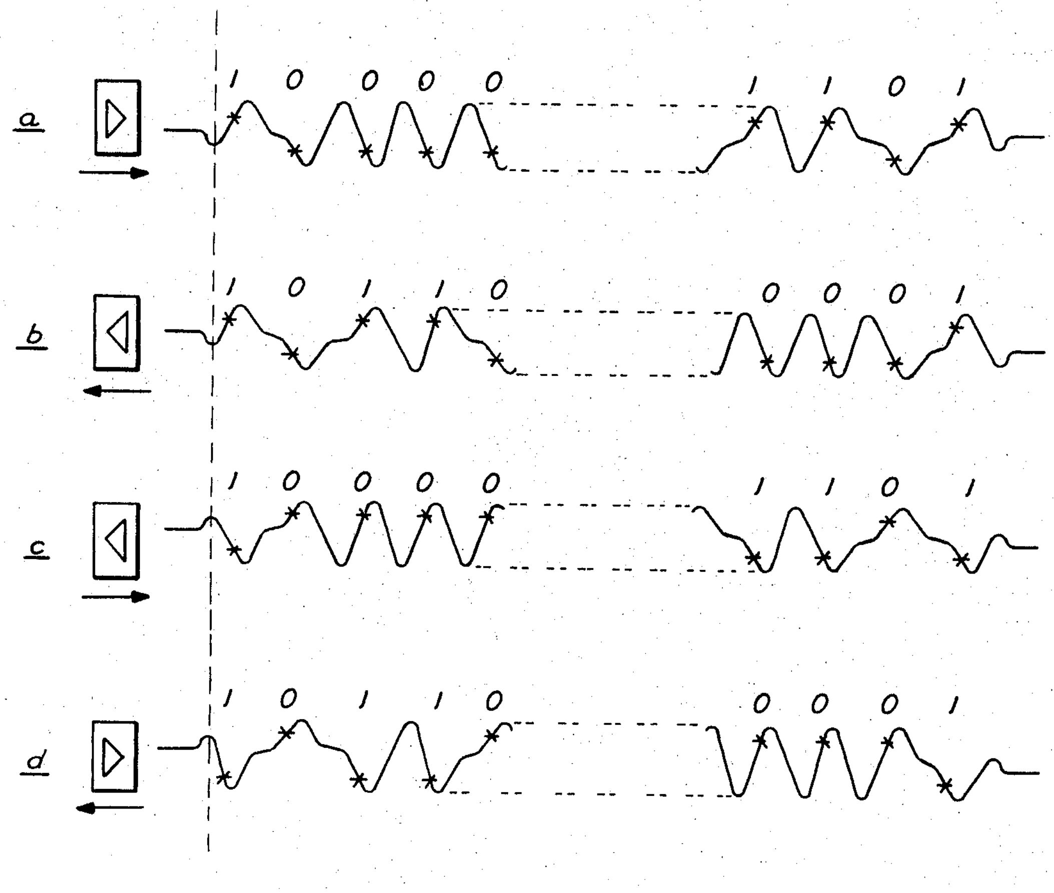
FIG. 1 are relative potential diagrams representative of the output signals produced by a magnetic transducer in its scan of a record carrier.

Referring first to FIG. 1 of the drawings, there is illustrated four waveform diagrams representative of the output signals produced by a magnetic transducer in its scan of a record carrier in the forward and reverse directions, and with a given and inverted relative pole piece polarity. Data in the record carrier is recorded via phase modulation, i.e., where a data "1" and a data "O" are each associated with a phase reversal of the recording current. Thus, a data "1" signal bit may correspond to a negative to positive transition on the middle of a data cell or wave cycle, and a data "O" will correspond to a positive to negative transition in the middle of the data cell.

Normally, in a phase modulated encoded message, the first few bits are used to signify a start code while the last few bits in the message signify an end code. Thus in the decoding of a data message transduced from a record carrier, the start and end of the message can be easily determined. The bits signifying the start and stop conditions are generally the mirror image of one another, as for example, a "l-O" for the start code and a "0-1" for the end of message code. The signal output waveform for a left to right sweep across the record carrier by a reader with a given pole piece polarity (designated as Δ) with respect to the direction of sweep of the record carrier is shown in FIG. 1*a*. The signal is sampled in the middle of a wave cycle as denoted by the "X" markings. Thus, with the given pole piece polarity or orientation and scan direction as shown in FIG. 1*a*, and if the signal waveform is to be representative of the data message indicated above the Figure, the detection of a positive slope direction is representative of a "1" data bit while a detected negative slope direction is representative of a "O" data bit.

The waveform signal illustrated in FIG. 1*b* is representative of the output signal obtained when the record carrier is scanned from right to left by a reader having the given pole piece polarity relative to the direction of scan. Since the last data bit in the stop code is a mirror image of the first data bit in the start code, it will be seen that the initial slope polarity of the first data peak in the Figure 1*b* waveform is the same as the initial slope polarity of the first data peak in the Fig. 1*a* waveform.

It will be understood that in the decoding circuitry for the record sensing system described above and in the noted co-pending applications, the operation is such that control of the system timing is initiated in response to the first data peak following the first positive slope of the transduced signal. Thus it will be seen from an inspection of the waveform diagrams in FIGS. 1*a* and 1*b* that since the initial slope polarity of both waveforms is the same, that the timing will be properly initiated whether scanning from left to right or from right to left and with the transducer having a given pole piece polarity in the direction of scan.

However, it will be noted that if in the scan of a record carrier, the transducer or reader is oriented such that its given pole piece polarity relative to the scan direction is inverted 180°, i.e., opposite to the relative pole piece polarity and scan direction illustrated for FIGS. 1*a* and 1*b* and again utilizing a start-stop code that are the mirror images of one another, then for these sweep readings the output waveform signal will have an initial data peak and first slope polarity opposite to that shown in FIGS. 1*a* and 1*b*. In particular, FIG. 1*c* is illustrative of the signal waveform output when scanning from left to right and with the reader pole piece polarity opposite to that which produced the FIG. 1*a* waveform. FIG. 1*d* is illustrative of the waveform signal output produced when scanning from right to left with the reader pole piece polarity opposite to that which produced the waveform in FIG. 1*b*. It will thus be apparent from an examination of FIGS. 1*c* and 1*d* that the first data peak following the first positive data slope will occur at a different point in time with respect to the signal output than is the case for the waveform signals illustrated in FIGS. 1*a* and 1*b*. Thus, the timing circuitry in the record sensing system will erroneously measure the timing interval between different points in the detected output signals and thereby provide incorrect system timing.

It will be apparent then that FIGS. 1*a-d* illustrate the various possible output signals produced by a reader in its scan of a magnetic record having a particular data message encoded thereon. In particular, FIGS. 1*a* and 1*b* illustrate the waveform signals produced with a given reader pole piece polarity relative the scan direction. FIGS. 1*c* and 1*d* illustrate the waveform signals produced with the reader pole piece polarity with respect to the scan direction being opposite to that indicated for FIGS. 1*a* and 1*b* respectively. It will be noted that the waveforms of FIGS. 1*c* and 1*d* are the inverse of the respective waveforms shown in FIGS. 1*a* and 1*b*.

Figure 2:
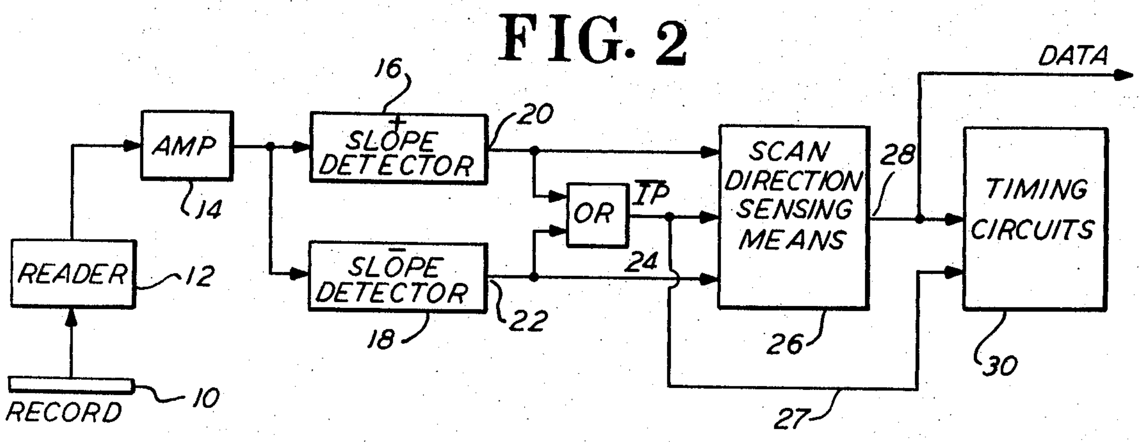
FIG. 2 is a simplified block diagram of a record sensing system including the direction sensing system of the present invention.

Referring now to FIG. 2, there is illustrated in block form a simplified diagram of a record sensing system embodying the direction sensing system of the present invention. A transducer 12 is arranged to scan a magnetically encoded data record or label 10. The signal output from the transducer 12 is coupled through an amplifier 14 to a pair of slope detector circuits hereinafter referred to as positive slope detector 16 and negative slope detector 18. Slope detector 16 operates, for example, to provide at an output terminal 20 a high level data signal in response to a negative to positive phase transition of the input signal, signifying a data "1" bit. Similarly, slope detector 18 operates to provide at an output terminal 22 a high level signal in response to a positive to negative phase transition of the input signal, signifying a data "O" information bit. Stated another way, the slope detector circuits operate to generate an output signal which changes state in response to a change of slope direction of the input waveform. In the illustrated example, the output of the positive slope detector 16 is a rectangular waveform signal which is in phase with the input waveform signal, while the output of the negative slope detector 18 is a rectangular waveform signal which is 180° out of phase with the input waveform signal.

The signal outputs from the slope detector terminals 20 and 22 are coupled to an OR gate logic circuit 24 which provides a pulse signal output, herein designated as the $\overline{IP}$ signal, in response to the detection of either a data "1" or data "O" information bit. The $\overline{IP}$ signal together with the signal outputs from the positive and negative slope detector circuits 16 and 18 are then coupled to a scan direction sensing means circuit indicated generally at 26 and which operates to provide at output terminal 28 thereof a data information signal suitable for the detection of proper system timing, irrespective of the pole piece polarity of the reader 12 relative to the direction of its scan over the record 10. The data signal output of the sensing means circuit 26 together with the $\overline{IP}$ signal output 27 from the OR gate 24 is then coupled to sentinel control and logic circuits included within the timing circuits 30 of the system for further processing as is described in the aforementioned copending application Ser. No. 239,457, now U.S. Pat. No. 3,770,987.

In order to begin timing properly, and also to determine the pole piece polarity or orientation of the reader relative to the direction of scan of the magnetic record, the present invention provides for the examination of the slope of the waveform data signal just preceding the first data peak or phase reversal of the waveform signal. If this first slope is negative, for example, the reader will have a given pole piece polarity with respect to its travel or scan across the record carrier and the system timing will be initiated on the data peak following the first positive data slope indication. On the other hand, if this first slope reading is positive signifying a reversal of the given reader pole piece polarity relative to the scan direction, the timing will be caused to begin on the data peak following the first negative data slope.

Figure 3:
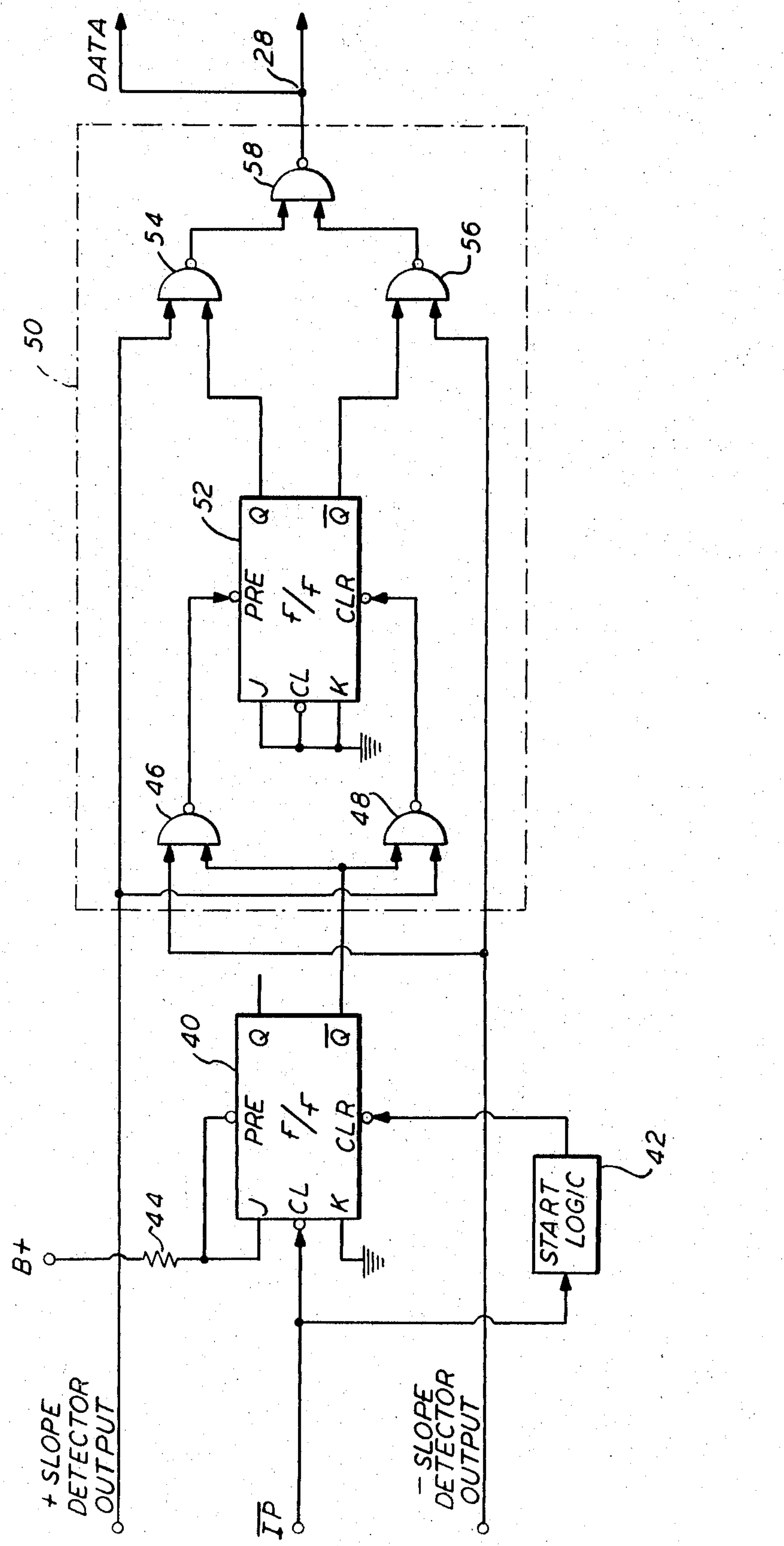
FIG. 3 is a more detailed logic diagram of the direction sensing system of the present invention.

Turning now to FIG. 3, there is shown a more detailed logic diagram of the direction sensing system 26 of the present invention.

It will be remembered that due to the coupling of the outputs from the slope detector circuits 16 and 18 through the OR logic circuit 24, for each change in slope direction of the input waveform signal, an $\overline{IP}$ pulse will be produced at the OR circuit output. Initially upon the detection of a message or data signal, there will be positive excursion of the $\overline{IP}$ signal. Thereafter negative going pulses will form the rest of the $\overline{IP}$ signal, Each pulse signifying a change in slope of the waveform of the detected data (see FIG. 4*d* waveform).

The $\overline{IP}$ signal from the OR circuit 24 is coupled to the "clock" input terminal of a first pulse detection means comprising a J-K flip-flop circuit 40 and also to a start control logic circuit 42. The logic circuit 42 operates in response to the absence of a data signal, to couple a reset signal to the reset or clear terminal of the J-K flip-flop 40 to insure that initially the output at the "$\overline{Q}$" terminal of the flip-flop circuit 40 is high. The "J" and "Preset" input terminals of the circuit 40 are connected together and maintained at a high level, as by coupling through a 1,000 ohm resistor 44 to a 5 volt B+ source; the "K" terminal of the flip-flop circuit being directly coupled to ground potential. The "$\overline{Q}$" output terminal of the flip-flop circuit 40 is coupled to the respective first inputs of first and second NAND gates 46 and 48 which form a logic steering gate control means for a head direction circuit means indicated generally by the dashed rectangle 50. The output from the positive slope detector 16 is coupled to the second input of the NAND gate 48, and the output from the negative slope detector 18 is coupled to the second input of the NAND gate 46.

The head direction means 50 includes a J-K flip-flop circuit 52 and an output logic arrangement of three NAND gates 54, 56 and 58. The output of the NAND gate 46 is coupled to the J-K flip-flops, "Preset" input terminal and the "Clear" input terminal receives the output from the NAND gate 48. The "J" and "K" and "Clock" input terminals are tied to ground. The "Q" terminal output of the flip-flop circuit is coupled to a first input of the NAND gate 54 and the "$\overline{Q}$" output terminal is coupled to a first input of the NAND gate 56. The output from the positive slope detector 16 is coupled to a second input of the NAND gate 54 and an output from the negative slope detector is coupled to a second input of the NAND gate 56, the outputs from the NAND gates 54 and 56 being respectively coupled to first and second inputs of the NAND gate 58, the output of which is the required data signal, and which is also coupled to the timing circuits for further processing as was heretofore noted.

Figure 4:
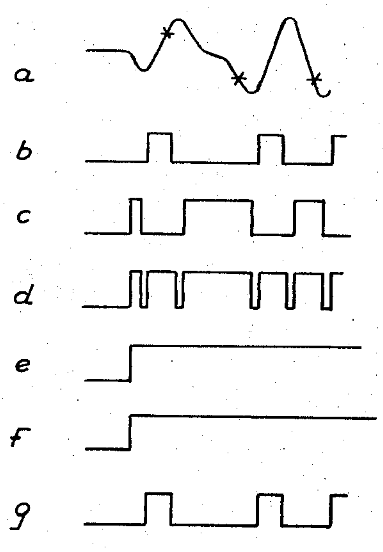
FIGS. 4 and 5 are potential waveform diagrams showing the relative timing and detected output signals at various points in the logic diagram of FIG. 3.

Turning now to FIG. 4, a portion of the detected output of the reader 12 with a given pole piece polarity, and produced during a left to right or forward scan of the record 10 is illustrated at line (*a*). The data "1" output of the positive slope detector 16 is shown at line (*b*); the data "O" output of the negative slope detector 18 at line (*c*); the $\overline{IP}$ output of the OR logic circuit 24 at line (*d*); the reset signal output of the start logic circuit 42 at line (*e*); the "Q" output of the flip-flop circuit 52 at line (*f*); and the data signal output at line (*g*).

Figure 5:
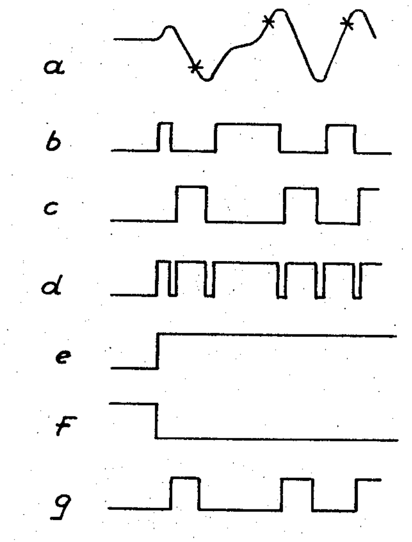

In FIG. 5, a portion of the detected waveform signal output of the reader 12 with the given pole piece polarity, but via a right to left or reverse scan of the record, is illustrated at line (*a*) thereof. The data "1" output of the positive slope detector 16 is shown at line (*b*); the data "O" output of the negative slope detector 18 at line (*c*); the $\overline{IP}$ output of the OR logic circuit 24 at line (*d*); the reset signal output of the start logic circuit 42 at line (*e*); the "Q" output of the flip-flop circuit 52 at line (*f*); and the data signal at line (*g*).

Operation of the invention will now be described with reference to the circuit diagrams of FIG. 3 and the waveform diagrams of FIGS. 4 and 5.

As was heretofore noted, initially the flip-flop 40 is reset by the low level output signal from the start logic circuit 24 so that the "$\overline{Q}$" output is high. Upon the detection of a message, the $\overline{IP}$ waveform will go high which in turn effects a removal of the low signal coupled to the "Clear" terminal of the flip-flop 40 from the start logic 42. As can be seen from the signal waveforms of FIGS. 4*d* and 4*e*, the start logic waveform signal is caused to go high in response to the initial positive excursion of the $\overline{IP}$ signal.

The "$\overline{Q}$" high output signal enables the NAND gates 46 and 48 for coupling of the slope detector output signals to the head direction means J-K flip-flop circuit 52. Noting that the output of the positive slope detector is coupled to the NAND gate 48 and the output of the negative slope detector to the NAND gate 46, then upon the detection of a data message, if the initial phase transition of the signal is negative, as by a forward scan of the record (FIG. 4*a*), the negative slope detector will produce a high level output signal (FIG. 4*c*) which is coupled to the NAND gate 46 causing the output therefrom which is coupled to the "Preset" terminal of flip-flop 52 to go low. This causes the "Q" output of the flip-flop 52 to go high (FIG. 4*f*). This "Q" output signal is coupled together with the positive slope detector output, (FIG. 4*b*) which is low, to NAND gate 54. At the same time the low level "$\overline{Q}$" output from the flip-flop 52 is coupled together with the high level output from the negative slope detector to the NAND gate 56.

Stated another way, the flip-flop 52 operates as a switching device which effectively is latched into one of two states in response to the first high level signal coupled to either the "Preset" or "Clear" terminals of the device respectively from the negative and positive slope detectors 18 and 16. The state in which the flip-flop is latched then determines whether the "Q" or "$\overline{Q}$" output therefrom is high and thus whether the positive or negative slope detector output signals will be gated through the logic arrangement of NAND gates 54, 56, and 58.

It should again be pointed out that the outputs of the negative and positive slope detector circuits are the inverse of one another, i.e., when one signal output is positive, the other output is negative. Thus, if upon the detection of a data message, the initial phase transition of the signal is positive, as by a reverse scan of the record (FIG. 5*a*), the positive slope detector will produce a high level output signal (FIG. 5*b*) which is coupled to the NAND gate 48 causing the output therefrom which is coupled to the "Clear" terminal of flip-flop 52 to go low. This causes the "$\overline{Q}$" output of the flip-flop 52 to go high and the "Q" output of the flip-flop 52 to go low (FIG. 5*f*). This "$\bar{Q}$" output signal if coupled together with the negative slope detector output, (FIG. 5*c*) which is low, to NAND gate 56. At the same time the low level "Q" output from the flip-flop 52 is coupled together with the high level output from the negative slope detector to the NAND gate 54.

The logic arrangement of the NAND gates 54, 56 and 58 is such that regardless of whether the initial slope direction of the transduced waveform signal is negative or positive, the pulse signal output from the NAND gate 58 will always have the same initial first pulse polarity, as is seen at line *g* in FIGS. 4 and 5. Thus, in the illustrated embodiment the output from the NAND gate will always be the true Data signal (FIG. 4*g* and FIG. 5*g*), regardless of the pole piece polarity of the reader or of the direction of scan.

To insure that the head direction flip-flop 52 will examine the polarity of the slope detector output signals only during the first pulse, the "J" and "Preset" terminals of the first pulse flip-flop circuit 40 are always maintained at a high potential. Upon the coupling of the first negative going $\overline{\text{IP}}$ pulse signal to the "Clock" terminal of the flip-flop 40, the circuit will be set thereby causing the "$\bar{Q}$" output to go low and subsequently stay in this condition for the duration of the transduced data message. With the "$\bar{Q}$" output low, the NAND gates 46 and 48 are disabled, thereby preventing further switching or toggling of the head direction flip-flop 52 in response to succeeding slope detector pulses. The head direction flip-flop 52 will thus remain in the appropriately switched state for the duration of the message.

We claim:

1. A system for determining the magnetization polarity of data bits in an information signal recorded on a record carrier, comprising:

means for scanning said carrier and providing an electrical signal output which varies in polarity as a function of the magnetization polarity of said recorded information signal;

means responsive to said electrical signal for providing at a first output thereof a pulse signal in phase with said electrical signal, and at a second output thereof a pulse signal 180° opposite in phase with respect to said electrical signal;

means receiving the first and second output signals and responsive to a predetermined initial slope polarity of said electrical signal for providing an output data signal corresponding to the one of said first and second output signals having said predetermined initial slope polarity;

said electrical signal responsive means including first and second slope detector circuits for respectively providing said in phase and out of phase signals;

said first slope detector circuit being responsive to a positive slope polarity of said electrical signal to generate a high level first output signal, and said second slope detector circuit being responsive to a negative slope polarity of said electrical signal to generate a high level second output signal;

means coupled to said first and second slope detector circuits and generating a third output pulse signal in response to each change in slope polarity of said electrical signal;

said means receiving the first and second output signals including:

bi-stable means having a first state of operation for providing a high level signal at a first output thereof and in a second state of operation for providing a high level signal at a second output thereof;

steering gate means coupled between said bi-stable means and said first and second slope detector circuits and responsive to a first high level signal transition of one of said slope detector output signals for causing said bi-stable means to assume said first operating state and in response to the first high level signal transition being from the other of said slope detector outputs for causing said bi-stable means to assume said second operating state; and logic means responsive to the selected high level output from said bi-stable means to gate the one of said first and second output signals having said predetermined initial slope polarity therethrough as the system output data signal.

2. The system as defined in claim 9 and further including:

means coupled to said steering gate means and responsive to said third output pulse signal for inhibiting a change in the operating state of said bistable means.

3. The system as defined in claim 2 wherein said bistable means is a flip-flop circuit and said logic means comprises first and second and third NAND circuits connected to receive said first and second outputs from said flip-flop so as to selectively pass the one of said first and second slope detector output signals having said predetermined initial slope polarity.

4. A system for determining the initial polarity direction of an electrical signal alternating in phase in accordance with the representation of binary encoded data;

a pair of slope detector circuits, each having an input terminal for receiving an electrical signal representative of binary encoded data, one of said slope detectors generating a high level first output signal in response to a positive slope polarity indication of said electrical signal, the other of said slope detectors generating a high level second output signal responsive to a negative slope polarity indication of said electrical signal;

means coupled to said first and second slope detector circuits for generating a third output pulse signal in response to each change in slope polarity of said electrical signal, a bi-stable means having a first state of operation for providing a high level signal at a first output thereof and in a second state of operation for providing a high level signal at a second output thereof;

steering gate means coupled between said bi-stable means and said first and second slope detector circuits and responsive to a first high level signal transition of one of said slope detector output signals for causing said bi-stable means to assume said first operating state and in response to the first high level signal transition being in the order of said slope detector output signals for causing said bistable means to assume said second operating state;

logic means responsive to the selected high level output from said bi-stable means to gate the one of said first and second output signals having said predetermined initial slope polarity therethrough as the system output data signal; and means coupled to said steering gate means and responsive to said third output pulse signal for inhibiting a change in the operating state of said bistable means.

* * * * *

UNITED STATES PATENT OFFICE

CERTIFICATE OF CORRECTION

PATENT NO. : 3,831,193

DATED : August 20, 1974

INVENTOR(S) : William McSweeney et al

It is certified that error appears in the above-identified patent and that said Letters Patent are hereby corrected as shown below:

Column 3, line 7, after "given" insert --reader--

Column 5, line 14, "Each" should be --each--

Column 7, line 2, "if" should be --is--

Column 8, line 19, "9" should be --1--

Column 8, line 48, delete first "a"

Column 8, line 58, "order" should be --other--

Signed and Sealed this

*tenth* Day of *February 1976*

[SEAL]

*Attest:*

RUTH C. MASON
*Attesting Officer*

C. MARSHALL DANN
*Commissioner of Patents and Trademarks*